United States Patent
Evans et al.

(10) Patent No.: US 8,245,302 B2
(45) Date of Patent: *Aug. 14, 2012

(54) NETWORK ATTACK VISUALIZATION AND RESPONSE THROUGH INTELLIGENT ICONS

(75) Inventors: Scott C. Evans, Burnt Hills, NY (US); T. Stephen Markham, Niskayuna, NY (US); Richard Bejtlich, Manassas Park, VA (US); Bruce G. Barnett, Schenectady, NY (US); Bernhard J. Scholz, Ballston Lake, NY (US); Robert J. Mitchell, Jr., Niskayuna, NY (US); Weizhong Yan, Clifton Park, NY (US); Jeremy Impson, Vestal, NY (US); Eric Steinbrecher, Windsor, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/882,637

(22) Filed: Sep. 15, 2010

(65) Prior Publication Data

US 2011/0066409 A1 Mar. 17, 2011

Related U.S. Application Data

(60) Provisional application No. 61/242,723, filed on Sep. 15, 2009.

(51) Int. Cl.
 *G06F 21/00* (2006.01)
(52) U.S. Cl. ............................................ 726/23; 726/22
(58) Field of Classification Search ............... 726/22–25
 See application file for complete search history.

(56) References Cited

U.S. PATENT DOCUMENTS

| | | | |
|---|---|---|---|
| 5,903,676 | A | 5/1999 | Wu et al. |
| 5,956,676 | A | 9/1999 | Shinoda |
| 6,189,005 | B1 | 2/2001 | Chakrabarti et al. |
| 6,601,048 | B1 | 7/2003 | Gavan et al. |
| 6,782,377 | B2 | 8/2004 | Agarwal et al. |
| 6,973,459 | B1 | 12/2005 | Yarmus |
| 7,007,035 | B2 | 2/2006 | Kamath et al. |
| 7,017,186 | B2 | 3/2006 | Day |

(Continued)

FOREIGN PATENT DOCUMENTS

JP 2000112917 4/2000

(Continued)

OTHER PUBLICATIONS

Evans et al., Towards Zero-Day Attack Detection through Intelligent Icon Visualization of MDL Model Proximity: Extended Abstract, VizSec2008 Conference Poster (Sep. 15, 2008).*

(Continued)

*Primary Examiner* — Jung Kim
*Assistant Examiner* — Theodore Parsons
(74) *Attorney, Agent, or Firm* — Miles & Stockbridge P.C.

(57) ABSTRACT

A network activity visualization system can include an MDL grammar database adapted to store a plurality of MDL grammars, and a pattern matching module adapted to match a received network activity data set against the MDL grammars by calculating a distance of the network activity data set from each MDL grammar. The system can also include an intelligent icon module adapted to receive the MDL grammars and distances of a network data set from each respective MDL grammar, and adapted to generate intelligent icons based on the MDL grammars and distances. The system can further include a display system adapted to display the intelligent icons so as to provide a visual indication of network security.

28 Claims, 6 Drawing Sheets

Normal Model

Attack Model 1

Attack Model 2

U.S. PATENT DOCUMENTS

| | | | |
|---|---|---|---|
| 7,089,592 | B2 | 8/2006 | Adjaoute |
| 7,134,141 | B2 | 11/2006 | Crosbie et al. |
| 7,254,273 | B2 | 8/2007 | Sakanashi et al. |
| 7,260,846 | B2 | 8/2007 | Day |
| 7,313,817 | B2 | 12/2007 | Evans et al. |
| 7,370,357 | B2 | 5/2008 | Sekar |
| 7,409,716 | B2 | 8/2008 | Barnett et al. |
| 7,613,572 | B2* | 11/2009 | Ben-Gal et al. ............. 702/19 |
| 2002/0147754 | A1* | 10/2002 | Dempsey et al. ............. 708/671 |
| 2003/0061015 | A1* | 3/2003 | Ben-Gal et al. ............. 703/2 |
| 2004/0157556 | A1* | 8/2004 | Barnett et al. ............. 455/41.2 |
| 2004/0250128 | A1 | 12/2004 | Bush et al. |
| 2005/0257269 | A1* | 11/2005 | Chari et al. ............. 726/25 |
| 2005/0273274 | A1 | 12/2005 | Evans et al. |
| 2005/0275655 | A1* | 12/2005 | Stolze et al. ............. 345/440 |
| 2006/0070128 | A1* | 3/2006 | Heimerdinger et al. ....... 726/23 |
| 2006/0212279 | A1 | 9/2006 | Goldberg et al. |
| 2007/0087756 | A1 | 4/2007 | Hoffberg |
| 2008/0016314 | A1 | 1/2008 | Li et al. |
| 2008/0065765 | A1* | 3/2008 | Hild et al. ............. 709/224 |
| 2008/0222725 | A1 | 9/2008 | Chayes et al. |
| 2008/0222726 | A1 | 9/2008 | Chayes et al. |
| 2008/0291934 | A1* | 11/2008 | Christenson et al. ......... 370/412 |
| 2009/0021517 | A1* | 1/2009 | Foslien ............. 345/440 |
| 2009/0138590 | A1* | 5/2009 | Lee et al. ............. 709/224 |
| 2010/0017870 | A1 | 1/2010 | Kargupta |
| 2010/0071061 | A1 | 3/2010 | Crovella et al. |
| 2010/0082513 | A1 | 4/2010 | Liu |
| 2010/0107253 | A1 | 4/2010 | Eiland |
| 2010/0107254 | A1 | 4/2010 | Eiland |
| 2010/0107255 | A1 | 4/2010 | Eiland et al. |
| 2010/0132039 | A1 | 5/2010 | Ji et al. |
| 2011/0016525 | A1* | 1/2011 | Jeong et al. ............. 726/23 |
| 2011/0029657 | A1 | 2/2011 | Gueta et al. |
| 2011/0066409 | A1 | 3/2011 | Evans et al. |
| 2011/0067106 | A1 | 3/2011 | Evans et al. |

FOREIGN PATENT DOCUMENTS

WO  WO 2005/055073 A1  6/2005

OTHER PUBLICATIONS

Keogh, E., Wei, L., Xi, X., Lonardi, S., Shieh, S., Sirowy, S., "Intelligent Icons: Integrating Lite-Weight Data Mining and Visualization into GUI Operating Systems," ICDM (2006).*

Adriaans, P. and P. Vitanyi, "The Power and Perils of MDL," in IAIT Nice, France (2007). Grunwald, P. D., "The minimum description length principle," 2007, Cambridge, Mass., MIT Press. 703 (2007).*

Ingham, K. L. and A. Somayaji, "A Methodology for Designing Accurate Anomaly Detection Systems," Latin America Networking Conference, San Jose, Calif.: ACM (2007).*

Munz, G., S. Li, and G. Carle, "Traffic anomaly detection using k-means clustering," Leistungs-, Zuverlassigkeitsund Verlasslichkeitsbewertung von Kommunikationsnetzen und Verteilten Systemen, 4 GI/ITG-Wks. MMBne, Hamburg, Germany (2007).*

Williamson, "Throttling viruses: restricting propagation to defeat malicious mobile code", Computer Security Applications Conference Proceedings (2002).*

Evans et al., "Network attack visualization and response through intelligent icons", Military Communications Conference (MILCOM) (Oct. 21, 2009).*

Ragsdale et al., "Adaptation techniques for intrusion detection and intrusion response systems", 2000 IEEE International Conference on Systems, Man, and Cybernetics (Oct. 8, 2000).*

Grunwald, P. D., "The minimum description length principle," 2007, Cambridge, Mass., MIT Press. 703 (2007).*

Yang, Peng, Ward, Rundensteiner, "Interactive hierarchical dimension ordering, spacing and filtering for exploration of high dimensional datasets", IEEE Symposium on Information Visualization—INFOVIS 2003, pp. 105-112 (2003).*

Edward Tufte, The Visual Display of Quantitative Information, 2 ed., p. 119 (Graphics Press 2001).*

Jonah Turner, "Easy as Pie Charts (Any Way You Slice 'Em)", SAS Global Forum, Pager 071-2008 (Mar. 16, 2008).*

LeRoy Bessler, "Communication-Effective Pie Charts", SAS Global Forum 2007, Paper 134-2007 (2007).*

Keim, Kriegal, "Visualization techniques for mining large databases: a comparison", IEEE Transactions on Knowledge and Data Engineering, pp. 923-938 (1996).*

Keim, "Designing pixel-oriented visualization techniques: theory and applications", IEEE Transactions on Visualization and Computer Graphics, pp. 59-78 (2000).*

Hao, Keim, "Importance-driven visualization layouts for large time series data", IEEE Symposium on Information Visualization—INFOVIS 2005, pp. 203-210 (2005).*

Ferreira de Oliveira, Levkowitz, "From visual data exploration to visual data mining: a survey", IEEE Transactions on Visualization and Computer Graphics, pp. 378-394 (2003).*

Nonfinal Office Action dated May 11, 2011, in U.S. Appl. No. 12/560,297, filed Sep. 15, 2009, entitled "Network Intrusion Detection Visualization".

Nonfinal Office Action dated Nov. 7, 2011, in U.S. Appl. No. 12/560,297.

* cited by examiner

Normal Model    Attack Model 1    Attack Model 2

NETWORK ATTACK VISUALIZATION AND RESPONSE THROUGH INTELLIGENT ICONS

This application claims the benefit of U.S. Provisional Application No. 61/242,723, entitled "Network Attack Visualization and Response Through Intelligent Icons" and filed on Sep. 15, 2009, which is incorporated herein by reference in its entirety.

This application is directed to an invention(s) that was made as a result of activities undertaken within the scope of a Joint Research Agreement made between Lockheed Martin Corporation and the General Electric Company.

Embodiments of the present invention relate generally to methods and systems for visualization and detection of network intrusions, more specifically, to methods and systems for visualization and detection of network intrusions using intelligent icons.

Providing information assurance, such as providing access to data and services to legitimate users while prohibiting or blocking unauthorized use, is an increasing challenge. Breaches in communications or data security can be costly. For example, a 2007 survey by the Computer Security Institute (CSI) Computer Crime and Security reported a per-incident cost of malicious activity at US$345K, more than double the reported per-incident cost in 2006. Other surveys have observed that the web-based attack rate has increased more than fifteen fold since 2005. One of the causes for these marked increases may be the ineffectiveness of known intrusion detection systems to address increasing attack release rates, such that many modern malicious activities can escape detection. For military applications, not only can there be financial exposure, but also the risk of physical harm as well.

Intrusion detection systems (IDS) may rely on a wide range of measures to detect intrusions. Traditional network inspection and traffic intelligence systems may rely upon signature-based detection or protocol anomaly identification to discover suspicious or malicious activity. In these traditional systems, the more "normal" an intruder acts, the less likely the intruder will be found. Conversely, the less "normal" an intruder acts, the more likely a traditional method will be effective and the intruder will be discovered.

Network security personnel may collect a wide variety of network activity data. This network activity data can include IDS alarms, full content, session data, and/or statistical data. The data collected may be manually mined for interesting activity. Also, personnel may rely on outside triggers or indications from alert data to prompt investigation of remaining data sources.

This traditional workflow may mean that the vast majority of data collected is often not inspected at all, although the data may be retained for a certain period of time to support network forensic investigations. Thus, there may be a need for an automated network activity data analysis and visualization system that can proactively identify intrusions and reduce the workload associated with traditional network data analysis.

In addition, once an attack is discovered and identified, in many cases a unique signature can be identified for that attack. Because the signatures for known attacks can be disseminated, it is possible that only a few known attacks may avoid detection. However, previously unknown (commonly known as "zero-day") attacks can often remain undiscovered until other observable events or symptoms such as, for example, a network slowdown or a rash of computer crashes, bring the attack to light.

Thus, the present inventors have determined there is a need for a network intrusion detection system and method that can, among other things, provide a tool for visualization of network activity data analysis and that can also address zero-day attacks.

One embodiment of the present invention includes a network activity visualization system that includes a minimum description length (MDL) based network intrusion detection system having an MDL grammar database adapted to store a plurality of MDL grammars, and a pattern matching module adapted to match a received network activity data set against the MDL grammars by calculating a distance of the network activity data set from each MDL grammar. The system also includes an intelligent icon module coupled to the MDL-based intrusion detection system and adapted to receive the MDL grammars and distances of a network data set from each respective MDL grammar, and adapted to generate intelligent icons based on the MDL grammars and distances. The system further includes a display system adapted to display the intelligent icons so as to provide a visual indication of network security.

Another embodiment includes a network monitoring and visualization system that includes a computer coupled to a network and adapted to receive data from the network. The computer includes a nontransitory computer readable medium having stored thereon software instructions for programming the computer to monitor the network and to provide a graphical visualization of monitored network activity, the software instructions, when executed by the computer, cause the computer to perform operations. The operations include retrieving a plurality of minimum description length (MDL) models, each model representing a different network activity behavior, and receiving network activity data corresponding to network activity. The operations can also include compressing the network activity data using an MDL compression module to generate compressed network activity data, and characterizing the compressed network activity data using the MDL models, the characterizing including generating a plurality of statistical features each representing a relationship between the compressed network activity data and a respective one of the MDL models. The operations further include generating a plurality of graphical representations each corresponding to one of the statistical features, and displaying one or more of the graphical representations on a display device coupled to the computer, the graphical representations providing a visual indication of the corresponding statistical feature.

Another embodiment is a computer-implemented method of intrusion detection visualization. The method includes retrieving a plurality of minimum description length (MDL) models, each model representing a different network activity behavior, and receiving network activity data corresponding to network activity. The method also includes characterizing the network activity data using the MDL models, the characterizing including generating a plurality of statistical features each representing a relationship between the network activity data and a respective one of the MDL models, and associating each of a plurality of graphical representations with a corresponding one of the MDL models. The method further includes altering the appearance of each graphical representation based on the statistical feature of the corresponding MDL model, and displaying one or more of the graphical representations on a display device coupled to the computer, the graphical representations providing a visual indication of the corresponding statistical feature.

Another embodiment includes a network monitoring and visualization system. The system includes a computer coupled to a network and adapted to receive data from the network, the computer including a computer readable medium having stored thereon software instructions for programming the computer to monitor the network and to provide a graphical visualization of monitored network activity, the software instructions, when executed by the computer, cause the computer to perform operations. the operations include retrieving a plurality of minimum description length (MDL) models, each MDL model representing a different network activity behavior and each MDL model including a grammar having a plurality of motifs, and receiving a network activity data sample corresponding to network activity. The operations also include applying the grammar of each MDL model to the data sample to determine a measure of similarity between the data sample and the MDL model corresponding to the grammar being applied, and characterizing the data sample based on the measure of similarity, including mapping a normalized difference value for each motif of a grammar to a generate a plurality of statistical features. The operations further include generating a plurality of intelligent icons, each corresponding to one of the MDL models and each including a plurality of graphical representations corresponding to one of the statistical features representing the normalized difference value of a respective one of the motifs for that MDL model, and simultaneously displaying the intelligent icons on a display device coupled to the computer.

Another embodiment includes a network activity visualization system. The system comprises a mathematical model database adapted to store a plurality of mathematical models, and a pattern matching module adapted to match a received network activity data set against each mathematical model by calculating a distance of the network activity data set from a respective one of the mathematical models. The system also comprises an intelligent icon generating module adapted to generate intelligent icons based on the mathematical models and corresponding calculated distances. The system further comprises a display adapted to display the intelligent icons so as to provide a visual indication of network security.

Yet another embodiment includes a computer-implemented method of intrusion detection visualization. The method includes retrieving a plurality of minimum description length (MDL) models, each model representing a different network activity behavior, and receiving network activity data corresponding to network activity. the method also includes characterizing the network activity data using a computer programmed to perform intrusion detection visualization and the MDL models, the characterizing including generating, with the computer, a plurality of statistical features each representing a relationship between the network activity data and a respective one of the MDL models. The method further includes associating, with the computer, each of a plurality of graphical representations with a corresponding one of the MDL models, and altering, with the computer, the appearance of each graphical representation based on the statistical feature of the corresponding MDL model. The method also includes displaying one or more of the graphical representations on a display device coupled to the computer, the graphical representations providing a visual indication of the corresponding statistical feature.

DETAILED DESCRIPTION

In general, results of an intrusion detection process can be displayed using intelligent icons such that network security personnel can better visualize network activity and detect possible intrusions. An example of an intrusion detection process includes a grammar-based Minimum Description Length (MDL) compression algorithm that is used to determine an attack based on closeness of fit to one or more compression models. Details of the compressed MDL model approach, among other things, are described in the following co-pending applications: U.S. application Ser. No. 12/560,297, entitled "Network Intrusion Detection Visualization," and filed on Sep. 15, 2009; U.S. application Ser. No. 12/260,627, entitled "MDL Compress System and Method For Signature Inference and Masquerade Intrusion Detection," and filed on Oct. 29, 2008; U.S. application Ser. No. 12/398,432, entitled "Intrusion Detection Using MDL Compression," and filed on Mar. 5, 2009; and U.S. application Ser. No. 12/260,682, entitled "Network Intrusion Detection Using MDL Compress for Deep Packet Inspection," and filed on Oct. 29, 2008, each of which is incorporated herein by reference in its entirety. Results of the MDL intrusion detection method described herein are mapped into probability distributions and partitions representing algorithmic statistics. Results of the mapping and partitioning can then be represented as an intelligent icon. While an MDL model approach is discussed herein as an example, it will be appreciated that the visualization techniques using intelligent icons can be applied to other intrusion detection methods.

Figure 1:
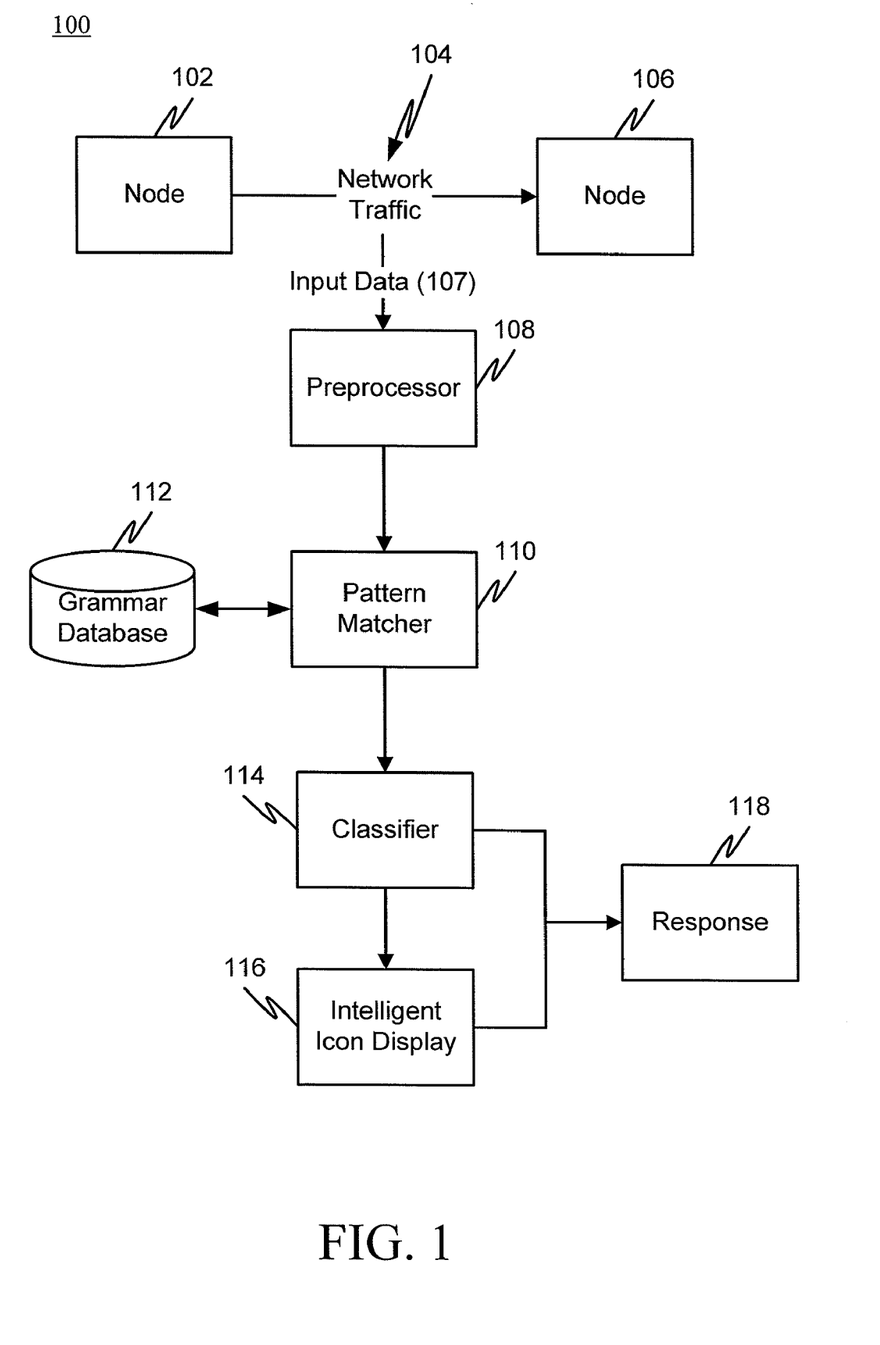
FIG. 1 is a network intrusion detection system according to various embodiments.

With respect to FIG. 1, there is shown a network intrusion detection system 100 according to various embodiments. As shown in FIG. 1, a network intrusion detection system 100 can comprise a pre-processor 108 coupled to a pattern matcher 110 and a classifier 114 also coupled to the pattern matcher 110. According to various embodiments, the pre-processor 108 can be configured to receive an input data stream 107, and be configured to output filtered data to the pattern matcher 110. The pattern matcher 110 can be configured to apply grammars retrieved from a grammar database 112 to the filtered or processed input data received from the pre-processor 108. In addition, in various embodiments, the pattern matcher 110 can calculate a distance value based on a closeness of fit of discrete sequential portions of the input data stream 107 with one or more class models.

In various embodiments, the classifier 114 can be coupled to the pattern matcher 110, to an intelligent icon display module 116 and to a response module 118. The classifier 114 can compare grammars generated or identified by the pattern matcher 110 to the input data stream 107. In particular, the classifier 114 can be configured to determine a likelihood of fit between each portion of the input data stream 107 and the class models based on the distance calculation results provided by the pattern matcher 110. For example, the classifier 114 can be configured to determine to which of a number of learned compression models the input data 107, as processed or filtered by the pre-processor 108, is closest. In this regard, the classifier 114 can receive distance values from the pattern matcher 110. Furthermore, the intelligent icon display 116, through a post processor (not shown) may assign each of the sequential portions of the input data stream 107 to one of the class models. The classifier 114 and/or intelligent icon display 116 can also be configured to output a recommendation as to whether the input data stream 107 has been classified as an attack, thus providing visualization of an attack on the network, or if normal behavior is determined, e.g., a healthy session. Further, the classifier 114 can also output an indication of the assigned class model. In various embodiments, the classifier 114, in evaluating a particular input data stream, can also take into consideration relevant information from one or more other input data streams.

For example, according to various embodiments, if input data is relatively "far" from all known normal and attack models, based on an expected information distance, then a potential zero day attack can be determined and a caution indication may be output by the intelligent icon display 116. Alternatively, a zero day attack indication can be output upon the determination of a zero day attack, or simply an attack indication can be output. As used herein, a "zero day attack" can refer to an attack which is being observed in the first instance and has not previously been determined to constitute a learned attack model.

In various embodiments, multiple different types of attack models can be supported. For example, models can be provided for attacks associated with buffer overflow, JavaScript™, user-to-root, and scan traffic types of activities.

According to various embodiments, the system 100 can further include a grammar database 112 operatively coupled to the pattern matcher 110. The grammar database 112 can include compression models such as, for example, health signature models and fault signature models formed using compressed data sets from application of a compression algorithm. The health signature models can include models associated with known healthy or normal session activity or behavior, and the fault signature models can include models associated with known attacks or other malicious or unauthorized activities. In various embodiments, the pattern matcher 110 can be configured to apply one or more of the compression models to the processed or filtered input data received from the pre-processor 108.

The system 100 can also include an input database (not shown) operatively coupled to the output of the pre-processor 108 and the input of the pattern matcher 110. In various embodiments, the input database can store input data that is processed or filtered by the pre-processor 108. The pattern matcher 110 can then retrieve or obtain the filtered input data from the input database independently of the data rate of the input data stream 107.

The pre-processor 108 can also be configured to apply a sliding window protocol to the input data stream that segments or divides the input data stream into discrete or separate portions of sequential information. Input data streams of various lengths can be supported such as, for example, input data streams of at least 1 KB in length. In various embodiments, the pre-processor 108 can filter the input data stream 107 by removing from consideration input data known to not be useful for harboring or supporting network attacks such as, for example, but not limited to, timestamp data.

According to various embodiments, the pre-processor 108 can also remove or filter packet payload components that could introduce ambiguities. Such unwanted components can be discarded or replaced with a discrete or binary value more amenable to classification. For example, various embodiments can include a Deterministic Finite Automata (DFA) model to eliminate "noise" inducing packet payloads from the input data stream 107. An example of such a DFA model is described in Ingham, K. L. and A. Somayaji, "A Methodology for Designing Accurate Anomaly Detection Systems," Latin America Networking Conference, 2007, San Jose, Calif.: ACM, which is hereby incorporated by reference. For example, in various embodiments, complex strings that have no intrusion detection information can be replaced with strings of X's or another no-operation code.

Furthermore, according to various embodiments, the pre-processor 108 can concatenate the input data stream payloads in receipt order, for input data that is not received sequentially or that is retrieved from a data store. In addition, the strings or requests monitored can be unidirectional to provide finer granularity. For example, monitored input data can include only client requests, only server responses, or both. The pre-processor architecture may vary depending on a particular implementation of an IDS (e.g., the pre-processor architecture can be used to customize the IDS or adapt it to specialized requirements of a contemplated application).

In various embodiments, the input data stream 107 can be received from an information system. For example, the information system can be a communication network such as, for example, an intranet or the Internet. In such embodiments, the input data stream can comprise packetized digital information such as, for example, digital information provided in accordance with the Transport Control Protocol/Internet Protocol (TCP/IP), the HyperText Transport Protocol (HTTP), the Simple Mail Transport Protocol (SMTP), or the Uniform Datagram Protocol (UDP). However, the network intrusion detection system 100 can be used for intrusion detection by intercepting or monitoring an information path between any two or more nodes of any communication system or, further, between any two or more nodes of a network or a distributed computing system, according to any protocol which could be used for malicious activity. In such embodiments, the input data stream 107 can be a sequential data stream.

In various embodiments, requests from client to server can be monitored for intrusion detection. Examples of such monitored requests include, for example, but not limited to, HTTP request payloads. Monitoring of requests can be advantageous because an external HTTP-based attack must start with a query, and so detecting malicious activity in queries can provide early detection. Furthermore, server responses include a wide variety of data types, making normal HTTP server responses difficult to model. In addition, client requests are more easily classified than server responses.

As used herein, the term "grammars" refers to a set of rules and relationships that are associated with particular data sequences. Furthermore, the term "model" or "compression model" as used herein refers to a set of one or more grammars with a probability distribution being associated with each grammar. For example, the pattern matcher 110 can take the grammars and apply them to an unclassified input stream, and then calculate the unknown data's distance from the known data classes, as represented by their models. The distance values can then be passed on to the classifier 114.

In various embodiments, the grammar inference algorithm can use Minimum Description Length (MDL) principles taken from the theory of Kolmogorov Complexity and Algorithmic Information Theory to infer a grammar, finding patterns and motifs that aid most in compressing unknown data sets. In particular, the grammar inference engine can use such an algorithm to infer grammars and then apply those grammars to identify masquerades or other difficult to detect intrusion attacks. In addition, in various embodiments, the system 100 can be configured to detect anomalous, hostile, or attack events in linear time. Further information regarding MDL principles is provided in Grunwald, P. D., "The minimum description length principle," 2007, Cambridge, Mass., MIT Press. 703, and Adriaans, P. and P. Vitanyi, "The Power and Perils of MDL," in IAIT 2007, Nice, France, both of which are hereby incorporated by reference. An example of K means clustering is provided in Munz, G., S. Li, and G. Carle, "Traffic anomaly detection using k-means clustering," Leistungs-, Zuverlässigkeitsund Verlasslichkeitsbewertung von Kommunikationsnetzen and Verteilten Systemen, 4 GI/ITG-Wks. MMBne, 2007, Hamburg, Germany.

Figure 2:
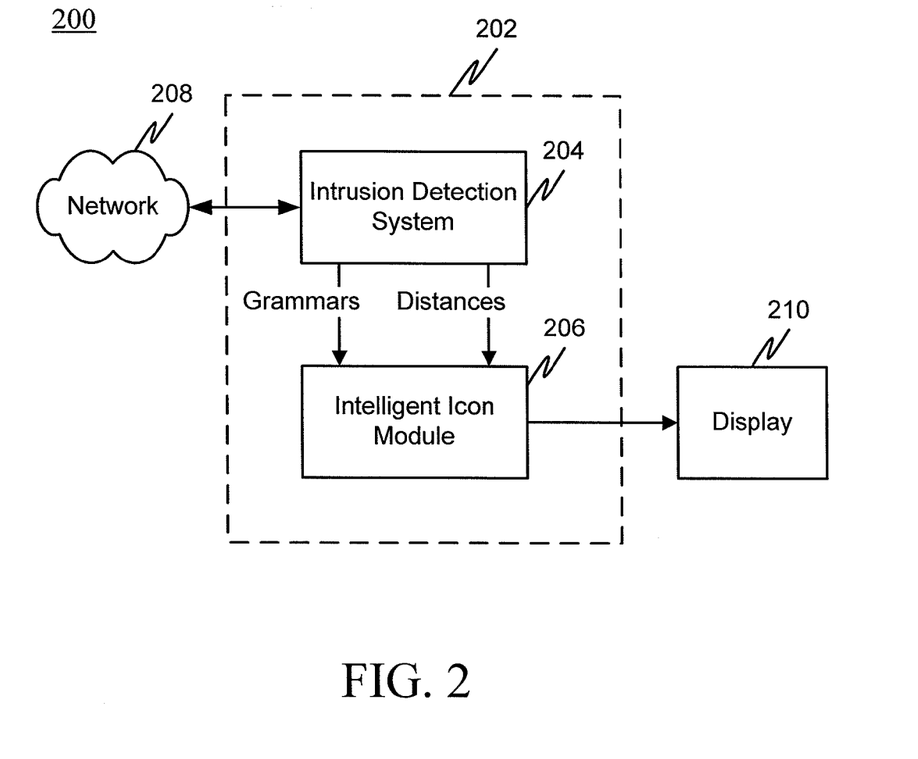
FIG. 2 is a diagram of an exemplary intrusion detection visualization system.

FIG. 2 is a diagram of an exemplary intrusion detection visualization system. In particular, a system 200 includes an intrusion detection computer 202 having an instruction detection system 204 and an intelligent icon module 206. The system 200 is coupled to a network 208 and a display 210.

In operation, the intrusion detection system 204 receives data from the network 208 and performs the MDL-based intrusion detection method described above. The intrusion detection system 204 communicates grammars and distances to the intelligent icon module 206. The intelligent icon module 206 updates the intelligent icons (as described above) for display on the display 210.

Figure 3:
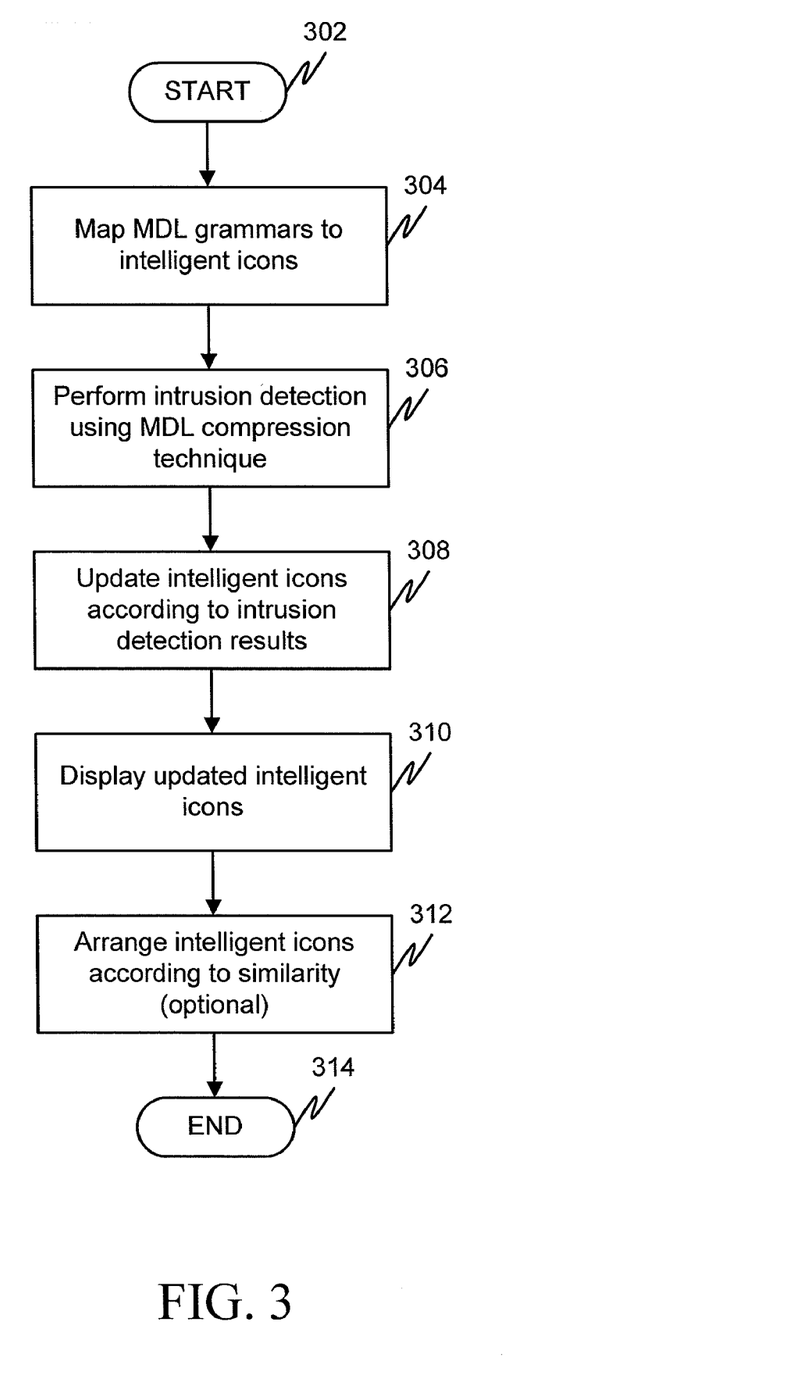
FIG. 3 shows a flowchart of an exemplary method for intrusion detection visualization.

FIG. 3 shows a flowchart of an exemplary method for intrusion detection visualization. In particular, processing starts at 302 and continues to 304.

At 304, grammars produced by an MDL compression module are mapped to graphical representations. The graphical representations can be intelligent icons. An example of intelligent icons is described in "Intelligent Icons: Integrating Lite-Weight Data Mining and Visualization into GUI Operating Systems," Keogh, E., Wei, L., Xi, X., Lonardi, S., Shieh, S., Sirowy, S., ICDM 2006, which is incorporated herein by reference.

In general, an intelligent icon system operates by replacing standard icons (which are typically static) with automatically generated icons (e.g., icons that may be dynamically updated in response to changes in data). The intelligent icons can have a feature (or features), such as graphic image, size, shape, and/or color, representing one or more underlying data values. For example, in the case of network intrusion detection, the intelligent icon can represent one of the MDL grammars and the color of the icon can represent the proximity of a network data set to the particular MDL grammar. One or more of the intelligent icons can be displayed simultaneously on a display device. Display devices can include a video display screen such as a CRT, plasma, LCD, LED, or laser, or the like. In addition or as an alternative, the intelligent icon system can provide output via a printer, a tactile signaling device, an audible signaling device, a visual signaling device, or a combination of the above.

By providing a visualization of a the proximity of a network data set to the MDL grammars, a network security operator can visually assess multiple dimensions of similarity as an aid to classification and labeling of the network data set. In addition to providing a visual indication of a data set's proximity to normal and attack MDL grammars, the system can also provide a visual indication that a network activity data set is not similar to known normal or attack MDL models, and therefore is potentially a zero-day attack. Also, the system can provide a visualization of a polymorphic attack (or one in which the attack signature changes or mutates). Polymorphic attacks may be challenging to discern and greater assistance may be required for network security personnel to assess a polymorphic attack situation and formulate an appropriate response. Intelligent icons can assist human operators in classifying a polymorphic attack and determining a correct response.

The system can present some or all of the intelligent icons to the operator. For example, the system can present the intelligent icons corresponding to the most similar models to the operator for visualization. The intelligent icons can be arranged according to their similarity, in a way much like traditional icons can be arranged by name, date, size, type, etc. By arranging the icons by their similarity, a network security operator can see, for example, all of the MDL grammars arranged by their proximity to the network data set being analyzed. Processing continues to 306.

At 306, an intrusion detection process is performed using the MDL compression technique described above. Processing continues to 308.

At 308, the intelligent icons are updated according to the results of the intrusion detection performed at 306. Processing continues to 310.

At 310, the updated intelligent icons are displayed on a display device. The display device can be local to the system performing the intrusion detection and intelligent icon update, or can be a remote display. Also, a mobile display device can be used, such as a laptop, wireless communications device, personal digital assistant (PDA), netbook, or the like. Processing continues to 312.

At 312, the intelligent icons are optionally arranged according to similarity. Processing continues to 314, where processing ends.

It will be appreciated that 302-312 can be repeated in whole or in part in order to perform a contemplated network intrusion visualization task.

Figure 4:
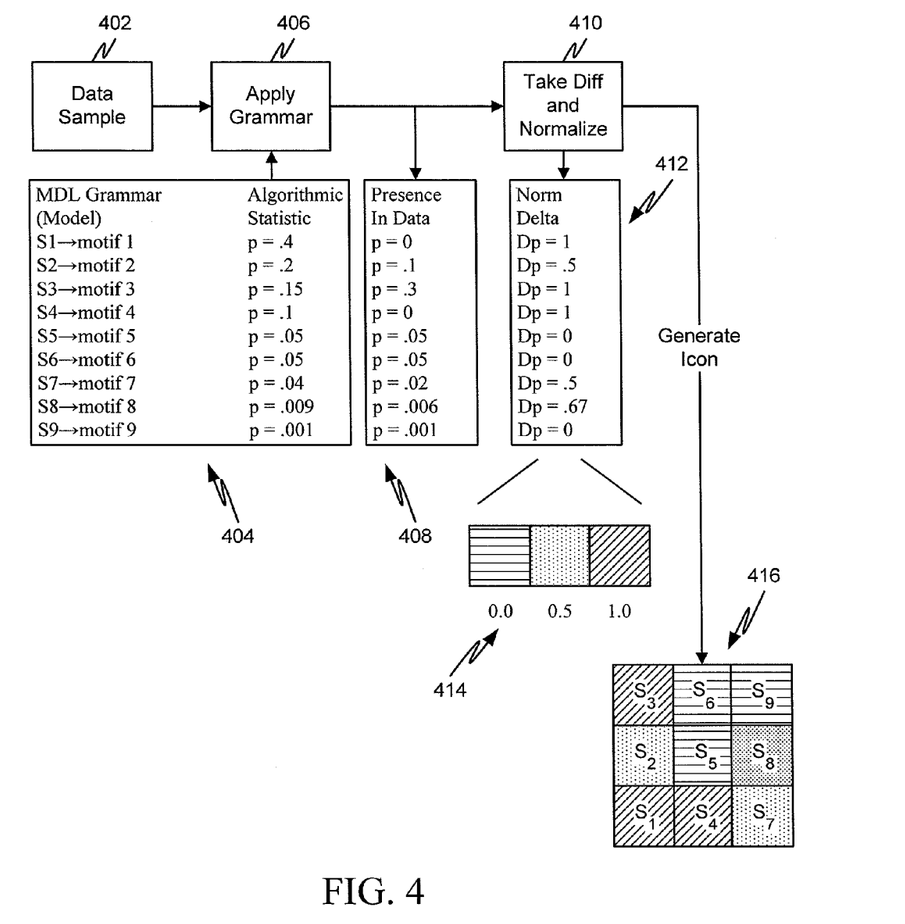
FIG. 4 is a diagram showing a data flow for generating an intelligent icon according to various embodiments.

FIG. 4 is a diagram showing a data flow for generating an intelligent icon according to various embodiments. In particular, a data sample 402 and an MDL model 404 are processed by applying a grammar of the MDL model 404 to the data sample 402. The MDL model 404 includes a grammar made up of one or more motifs (or components or units each representing a portion of data making up network activity the model is used to represent). In the example shown in FIG. 4, the MDL model 404 includes nine motifs. For the given model, the nine motifs range in statistical occurrence rates from 0.4 for motif 1, to 0.001 for motif 9. The occurrence rate, in this example, can be correlated with the relative importance of that motif to the model. In other words, if a model includes a high occurrence rate of a particular motif (e.g., motif 1 in the MDL model 404), then that motif is likely to be important to the model and can be given greater emphasis in the presentation and visualization. For example, emphasis may correspond to placement of a graphical element, or the size, shape or other visual feature of a graphical element may be used to indicate relative importance of the motif represented by that graphical element.

Also, the motifs of an MDL model grammar serve to partition a network data sample. In other words, each motif identifies the portion of the data that corresponds to that motif. In this way, the MDL model grammar can partition the data sample not according to an expected data arrangement or signature, but rather according to the portions of data represented by the motifs. By recognizing the motifs that make up a particular model rather than an expected sequence of data, the MDL model intrusion detection approach can be more robust at detecting intrusions and recognizing attempts to mask the signature of an exploit or attack data stream.

Once the MDL model 404 grammar has been applied to the data sample 402, a measure of presence (or occurrence) 408 of each motif in the data can be generated. A delta (or difference) can be computed between the statistical distribution of the MDL model 404 and the measure of presence 408. The difference data can be normalized to produce normalized difference data 412.

Each value of the normalized difference data 412 can then be mapped to a graphical display property. In FIG. 4, the normalized difference values have been mapped to fill patterns 414. It will be appreciated that other graphical features can be mapped to the normalized values such as color, size, shape, text, or the like. In general, any method for graphically representing a numerical value may be used.

In the example shown in FIG. 4, a normalized difference value of 0 is mapped to a horizontal line fill pattern, a normalized difference value of 0.5 is mapped to a dot fill pattern and a normalized difference value of 1.0 is mapped to a diagonal line fill pattern. The mapping of the fill patterns to the normalized difference values is used to generate an intelligent icon 416.

In the intelligent icon 416, each square represents a motif and the fill pattern for that square maps to the normalized difference value for that motif. For example, motif 1 should occur at a rate of 0.4 in a data sample that correspond to the MDL model 404. In the data sample 402 being analyzed, motif 1 was not present at all, as shown in the first data line of the measure of presence 408. This produces a normalized difference of 1 (in other words there is a one hundred percent difference between the expected occurrence rate of the model motif and the actual occurrence rate in the data sample). This maps to a diagonal line fill pattern which is used to fill square $S_1$ of the intelligent icon 416.

Square $S_1$ of the intelligent icon 416 is located in the lower left position of the intelligent icon. As discussed above, the placement of a graphical element can be used to represent its relative weight or importance in the model. Here, in the example of FIG. 4, the most frequently occurring (e.g., here most "important") motifs are placed in the lower left corner, with motifs of lesser importance being placed above and to the right across the intelligent icon. Establishing a known placement system can help network security operators to gauge not only the overall similarity of a data sample to a model, but to also determine, within that model, which elements of the model correlate most closely with the data sample. This information can be used to further refine the process of identification of network intrusions. It will be appreciated that the most important or heavily weighted motif of a model my not necessarily be the most frequently occurring. For example, a particular attack model may have a motif that would be required for that model, but which may occur few times. In this case, the system would place a greater weight or importance on that motif even though it is not a frequently occurring motif. So, an MDL model statistical distribution could be weighted to place emphasis on a motif that is important to the model, but which does not otherwise occur frequently. A weight table, or other similar data structure, could be used to weight the statistical distribution of an MDL model.

Figure 5:
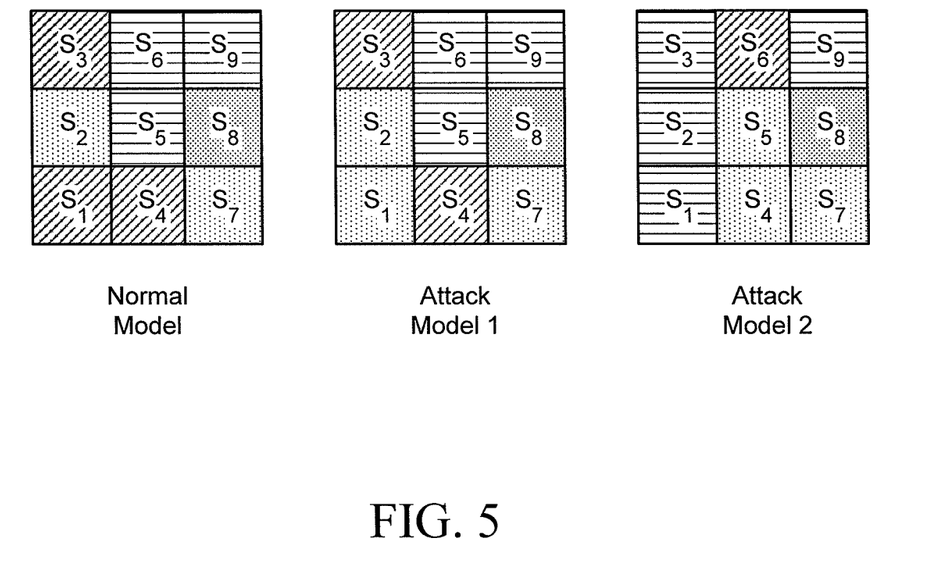
FIG. 5 is a diagram of an exemplary network intrusion detection visualization display in accordance with various embodiments.

FIG. 5 is a diagram of an exemplary network intrusion detection visualization display in accordance with various embodiments. In particular, FIG. 5 shows three intelligent icons: a normal activity icon, an attack model 1 icon and an attack model 2 icon, each representing application of their respective MDL model to a network activity data sample. In practice, a network intrusion detection visualization system according to the present disclosure could provide a display similar to that shown in FIG. 5. An operator may wish to see a data sample compared to various MDL models including normal and attack models. In this way, an operator may gain a visual insight into the nature of the network activity producing the data sample and also, as discussed above, within each model, those parts that are most similar to the data sample.

The intelligent icons of FIG. 5 are arranged like the intelligent icon 416 of FIG. 4 in that the graphical elements representing the most frequently occurring or most important motifs are placed in the lower left corner. Also, the same fill pattern mapping scheme as that shown in FIG. 4 is being followed in the example of FIG. 5.

From the intelligent icons, it is clear that the data sample is not correlating with the normal model, because there are large differences in the lower left corner elements, as shown by the diagonal fills in some of those elements. The data sample appears to be correlating moderately well to the attack model 1 MDL model. This is illustrated by the mid-range normalized difference values in the lower left elements as shown by the dot fill patter. The data sample appears, in this example, to be most closely correlated with the attack model 1 MDL model. This is shown by the small differences with respect to the important elements (e.g., S1-S3) as indicated by the diagonal fill pattern in those elements. From this display, an operator would be able to determine that the network data being analyzed appears to match the behavior associated with the attack model 2 MDL model. The operator could then take appropriate action based on the intrusion detection visualization display. As the example in FIG. 5 shows, data generated by processing a data sample and comparing with multiple features of multiple MDL models can be readily visualized using an embodiment. Three intelligent icons are shown for purposes of illustrating features. It will be appreciated that more or less intelligent icons could be displayed and could be arranged in other ways such as grids. Also, while square icons are shown with square features, it will be appreciated that other graphical elements could be used. In addition to graphical elements, audible or other indications could also be used to represent relative similarity between a data sample and an MDL model. For example, if a data sample is within a certain distance of an attack MDL model, a system may provide a visually and/or audible alarm (or other suitable type of alarm) to alert an operator. Although, the exemplary embodiments have been described using MDL models, it will be appreciated that any mathematical, or other, model, method or process capable of performing functions similar or equivalent to those described in connection with MDL models can be used.

Figure 6:
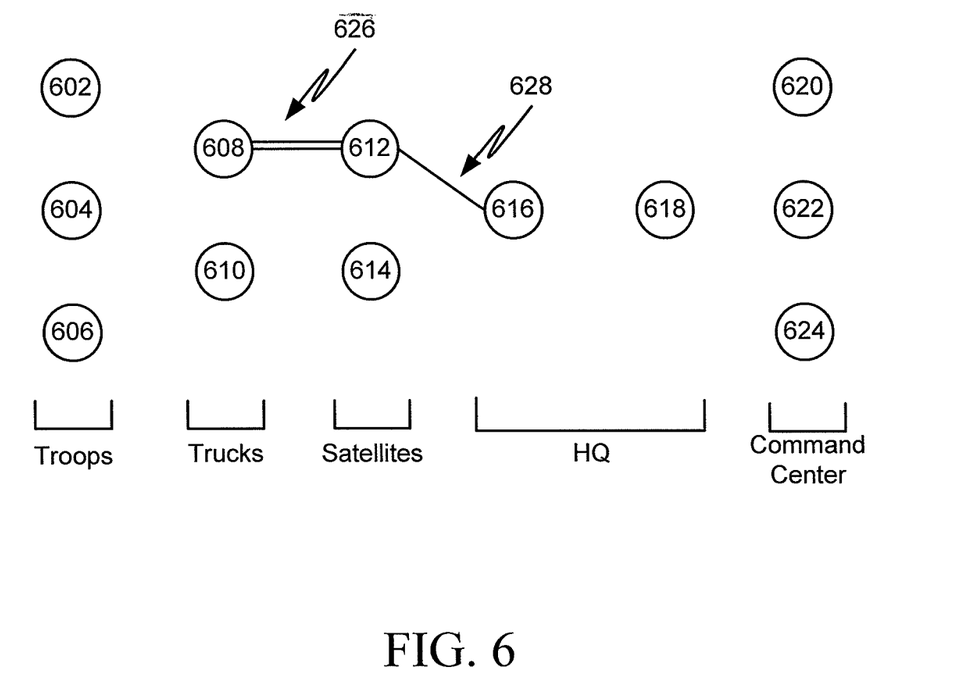
FIG. 6 is a diagram showing network communications between trucks and satellites with a possible attack or intrusion on the network.

FIG. 6 shows a data communications network comprising troops (602-606), trucks (608-610), satellites (612-614), headquarters nodes (616 and 618) and command center nodes (620-624). Network communications between the troops, trucks, satellites, headquarters nodes and command center nodes can be monitored using an intelligent icon visualization system in accordance with one or more embodiments.

As an example of an attack response using an embodiment of the present invention, a forward truck node (608) is reporting data back to headquarters (616) in a command center. An intermediate satellite relay node (612) may detect malicious behavior (626) targeting the forward truck node (608) and signal an attack detection. Depending on things such as the value to the mission of the data feed and the a priori expectation of an attack, a network operator may be hesitant to end or terminate the data flow (628) from the forward truck node (608) to the headquarters node (616) via the intermediate satellite relay node (612).

Responses to malicious activity, an intrusion or an attack can include dropping packets (or ending or terminating the data feed) or downgrading the quality of service (QoS) level of packet delivery such the "good" data stream benefits, while providing some level of success in preventing or hindering the malicious data stream. If the alarm regarding the malicious stream turns out to be a false alarm, the choice to downgrade quality of service would prove beneficial.

An intelligent icon display system, in accordance with one or more embodiments, enables a network security operator to see what caused the alarm and identify an appropriate response with higher confidence. The intelligent icons can show whether an alarm was caused by matching a few key motifs, or many less significant motifs. The visibility into the cause of the alarm signal and the relative importance of the motifs within a model can enable a decision to downgrade QoS with higher confidence and may lead to fewer unnecessary data feed terminations or dropped packet responses.

It will be appreciated that the modules, processes, systems, and sections described above can be implemented in hardware, software, or both. For example, a visualization system (e.g., 100 or 200) can be implemented, for example, using a processor configured to execute a sequence of programmed instructions. The processor can be for example, but not limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as C++. The instructions can also comprise code and data objects provided in accordance with, for example, the Visual Basic™ language, or another object-oriented programming language. The sequence of programmed instructions and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor. Also, the processes, modules, and sub-modules described in the various figures of and for embodiments above may be distributed across multiple computers or systems or may be co-located in a single processor or system. Exemplary structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any process capable of implementing the functions or steps described herein can be used to implement embodiments of the method, system, or a computer program product (software program).

Furthermore, embodiments of the disclosed method, system, and computer program product may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the mechanical and/or computer programming arts.

Moreover, embodiments of the disclosed method, system, and computer program product can be implemented in software executed on a programmed general purpose computer, a special purpose computer, a microprocessor, or the like.

In various embodiments, the grammar database and the input database can be implemented using any commercial database or database management system such as, for example, Oracle Database 11g available from Oracle Corporation of Redwood Shores, Calif.

It is, therefore, apparent that there is provided, in accordance with the various embodiments disclosed herein, a network intrusion detection visualization system and method. Attacks detected and visualized can include zero-day attacks.

While the invention has been described in conjunction with a number of embodiments, it is evident that many alternatives, modifications and variations would be or are apparent to those of ordinary skill in the applicable arts. Accordingly, Applicants intend to embrace all such alternatives, modifications, equivalents and variations that are within the spirit and scope of the appended claims.

What is claimed is:

1. A network intrusion visualization system comprising:
a computer coupled to a network and adapted to receive data from the network, the computer including a nontransitory computer readable medium having stored thereon software instructions for programming the computer to provide a graphical visualization of monitored network activity, the software instructions, when executed by the computer, cause the computer to perform operations including:
applying a grammar having a plurality of motifs to a network activity data sample to determine a measure of similarity between the data sample and each of a plurality of models representing different network activity behaviors associated with the grammar;
characterizing the data sample based on the measure of similarity, including mapping a normalized difference value for each motif of the grammar to generate a plurality of statistical features;
generating a plurality of intelligent icons, each icon corresponding to one of the models and having a respective plurality of graphical representations each corresponding to a different statistical feature representing the normalized difference value of a respective one of the motifs for that model; and displaying the intelligent icons and the respective plurality of graphical representations on a display device coupled to the computer, wherein the operations further include arranging the graphical representations based on a relative importance of a corresponding motif within the model associated with that motif.

2. The system of claim 1, wherein the operations further include arranging the graphical representations simultaneously on a display.

3. The system of claim 1, wherein the characterizing includes calculating a proximity between the data sample and the models.

4. The system of claim 1, wherein the network activity is classified as normal activity or threat activity based on the characterization of the data sample.

5. The system of claim 1, wherein the network activity is classified as a zero day attack when the data sample is determined to have a distance from each model that is above a predetermined threshold.

6. The system of claim 1, wherein the models include a group of normal network activity models and a group of attack network activity models, and intelligent icons representing both groups are displayed simultaneously.

7. The system of claim 6, wherein the statistical features indicate whether the network activity data is more likely correlated with the group of normal network activity models or with the group of attack network activity models.

8. The system of claim 1, wherein the statistical features indicate a proximity of the network activity relative to one or more of the models.

9. The system of claim 1, wherein the statistical features indicate that the network activity data represents a new network behavior when the statistical features exceed a threshold distance from the models.

10. The system of claim 1, wherein the models are MDL models.

11. A network activity visualization system comprising:
a pattern matching module adapted to match a received network activity data set, containing data representing electronic activity in an electronic communications network, against each of a plurality of mathematical models by calculating a distance of the network activity data set from a respective one of the mathematical models, the mathematical models each having a plurality of motifs associated with a grammar; and
an intelligent icon display module adapted to generate intelligent icons each corresponding to a different one of the mathematical models so as to provide a visual indication of network security, the generated intelligent icons adapted for display on a display device and each intelligent icon having a graphical representation corresponding to a different statistical feature representing a normalized difference value of a respective one of the motifs for that model,
wherein the intelligent icon display module is further adapted to arrange the intelligent icons based on a relative importance of a corresponding motif within the model associated with that motif.

12. The system of claim 11, wherein when the distance between the network activity data set and each of the mathematical models exceeds a predetermined threshold, the network activity data is identified as a new behavior and a mathematical modeling process is performed on the network activity data to generate a new mathematical model.

13. The system of claim 12, wherein the new mathematical model is classified as a normal mathematical model or an attack mathematical model.

14. The system of claim 13, wherein the new mathematical model is added to a mathematical model database.

15. A computer-implemented method of intrusion detection visualization comprising:
characterizing network activity data using a computer programmed to perform network intrusion visualization, the characterizing including generating, with the computer, a plurality of statistical features each representing a relationship between the network activity data and a corresponding one of a plurality of models representing network activity behavior, each of the models having a plurality of motifs associated with a grammar;
associating, with the computer, each of a plurality of graphical representations with a corresponding one of the models;
altering, with the computer, a visual appearance of each graphical representation of an associated model based on a corresponding statistical feature of that model from said plurality of statistical features to generate altered graphical representations;
downgrading quality of service to a network data transfer associated with the network activity data based on an indication in one of the statistical features that the network activity represents an intrusion;
displaying one or more of the altered graphical representations on a display device coupled to the computer, the altered graphical representations providing on the display device a visual indication of the statistical features corresponding to the models associated with the graphical representations; and
arranging the altered graphical representations based on a relative importance of a motif corresponding to the model associated with each respective altered graphical representation.

16. The method of claim 15, further comprising further arranging the graphical representations on the display device based on similarity of said statistical features corresponding to the models associated with the graphical representations.

17. The method of claim 15, wherein the characterizing includes calculating, with the computer, a proximity between the network activity data and each model.

18. The method of claim 15, wherein the network activity is classified as normal activity or threat activity based on a result of the characterizing.

19. The method of claim 15, wherein the network activity is classified as a zero day attack when the network activity data is determined to have a distance from each of the models that is above a predetermined threshold.

20. The method of claim 15, wherein the models include a group of normal network activity models and a group of attack network activity models.

21. The method of claim 20, wherein each statistical feature of a corresponding model from said plurality of statistical features indicates whether the network activity data is more likely correlated with the group of normal network activity models or with the group of attack network activity models.

22. The method of claim 15, wherein the models are MDL models.

23. The system of claim 1, wherein the network activity data sample is taken from a network connecting a truck and a satellite.

24. The system of claim 1, wherein the operations further include downgrading quality of service, but not terminating, data transfer in the network associated with the network activity data sample based on a measure of similarity between the data sample and one or more of the models associated with an intrusion.

25. The system of claim 11, wherein the network activity data set is taken from a network connecting a truck and a satellite.

26. The system of claim 11, further including downgrading quality of service, but not terminating, data transfer in the network associated with the network activity data set based on a measure of similarity between the data set and one or more of the mathematical models associated with an intrusion.

27. The method of claim 15, wherein the network activity data is received from a network connecting a truck and a satellite.

28. A network intrusion visualization system comprising:
a computer coupled to a network and adapted to receive data from the network, the computer including a non-transitory computer readable medium having stored thereon software instructions for programming the computer to provide a graphical visualization of monitored network activity, the software instructions, when executed by the computer, cause the computer to perform operations including:
applying a grammar having a plurality of motifs to a network activity data sample to determine a measure of similarity between the data sample and each of a plurality of models representing different network activity behaviors associated with the grammar, the models including a group of normal network activity models and a group of attack network activity models;
characterizing the data sample based on the measure of similarity, including mapping a normalized difference value for each motif of the grammar to generate a plurality of statistical features;
generating a plurality of intelligent icons, each icon corresponding to one of the models and having a respective plurality of graphical representations each corresponding to a different statistical feature representing the normalized difference value of a respective one of the motifs for that model; and
displaying simultaneously the intelligent icons corresponding to both the group of normal network activity models and the group of attack network activity models, and displaying the respective plurality of graphical representations on a display device coupled to the computer.

* * * * *